US005868277A

United States Patent [19]

Schafer

[11] Patent Number: 5,868,277

[45] Date of Patent: Feb. 9, 1999

[54] TICKET DISPENSER BASE ASSEMBLY

[75] Inventor: Christopher E. Schafer, Adair, Iowa

[73] Assignee: Schafer Systems Inc., Adair, Iowa

[21] Appl. No.: 763,856

[22] Filed: Dec. 11, 1996

[51] Int. Cl.[6] .................................................... B65G 59/00

[52] U.S. Cl. ............................................ 221/282; 221/284

[58] Field of Search ...................................... 221/282, 284

[56] References Cited

U.S. PATENT DOCUMENTS

| | | | |
|---|---|---|---|
| 2,434,993 | 1/1948 | Dwyer | 221/282 |
| 4,919,250 | 4/1990 | Olson et al. | 221/282 |
| 5,240,147 | 8/1993 | Frazier et al. | 221/153 |
| 5,397,019 | 3/1995 | Schmitt | 221/130 |
| 5,788,347 | 8/1998 | Rabinovitz | 312/111 |

*Primary Examiner*—Karen M. Young
*Assistant Examiner*—Thuy V. Tran
*Attorney, Agent, or Firm*—G. Brian Pingel

[57] ABSTRACT

A hinged access display and dispensing device for lottery-type tickets is provided with a base which may be quickly secured by hand, but is thereafter difficult to remove. The device includes a box-like housing provided with a hook and a pair of legs and feet. The base is provided with a ridge and a pair of holes and associated resilient tongues extending over the holes. The housing is placed over the base with the hook cupping the ridge. The legs force the tongues downward allowing insertion of the feet through the holes. The housing is then moved rearward to allow the tongues to move to their original position, thereby preventing lateral movement of the legs and removal of the feet from the holes.

16 Claims, 6 Drawing Sheets

TICKET DISPENSER BASE ASSEMBLY

BACKGROUND OF THE INVENTION

1. Field of the Invention

The present invention relates in general to lottery-type ticket dispensers and the like, and, more specifically, to a dispenser and base which allows for easy assembly while hindering unauthorized disassembly.

2. Description of the Prior Art

The use of box-like structures for displaying and dispensing of tickets has been known for some time. Generally, such dispensers have common characteristics such as transparent walls, through which a stack of tickets may be seen, means for preventing unauthorized removal of tickets therefrom and a slot through which the tickets may be dispensed.

It is also known in the art to secure such box-like structures to a counter or base to prevent unauthorized removal of the box-like structure and the tickets contained therein. It is known in the art to provide the bottom of the dispenser itself with adhesive to secure the device to a counter. The drawback of such an adhesive connection is two-fold. First, the security of such a connection is limited by the strength of the adhesive, which is typically of only moderate strength to reduce damage to the counter or base of the dispenser. Second, removal of such a dispenser after it has been adhesively secured is difficult and often results in damage to either the dispenser or the counter.

It is also known in the art to provide connection by way of screws or other hardware. While such hardware minimizes damage to the counter and increases the security of the dispenser, such hardware cannot be molded integrally with the dispenser and typically requires tools for installation and removal of the dispenser. Additionally, the size of typical dispensers hinders the use of standard tools for the installation and removal of such hardware.

The difficulties encountered in the prior art discussed hereinabove are substantially eliminated by the present invention.

SUMMARY OF THE INVENTION

A hinged access display and dispensing device for lottery-type tickets is provided with a housing, a door and a base. The housing is of a box-like configuration having a floor, a roof, a pair of sidewalls, a front end and an open rear end. The door is pivotally attached to the housing. The base is provided with a ridge and a hole.

Secured to the housing is a leg being of a construction capable of extending through the hole. Secured to the leg is a foot which extends away from the leg a sufficient distance to allow the foot to be oriented under the base when the leg is inserted into the hole. Resilient means are secured to the base for maintaining the foot under the base after insertion of the leg into the hole. Means are provided on the housing for securing the housing to the ridge of the base when the foot is secured in the hole by the resilient means.

In the preferred embodiment, the base is provided with two holes and the housing is provided with two legs and two feet. The housing is provided with a hook, which cups around the ridge of the base as the legs are used to depress the resilient means to insert the feet through the hole and under the base. Once the feet have been moved under the base, the resilient means move to their starting position to prevent lateral movement of the legs, and thereby prevent unauthorized removal of the feet from the holes.

DETAILED DESCRIPTION OF THE PREFERRED EMBODIMENT

Figure 2:
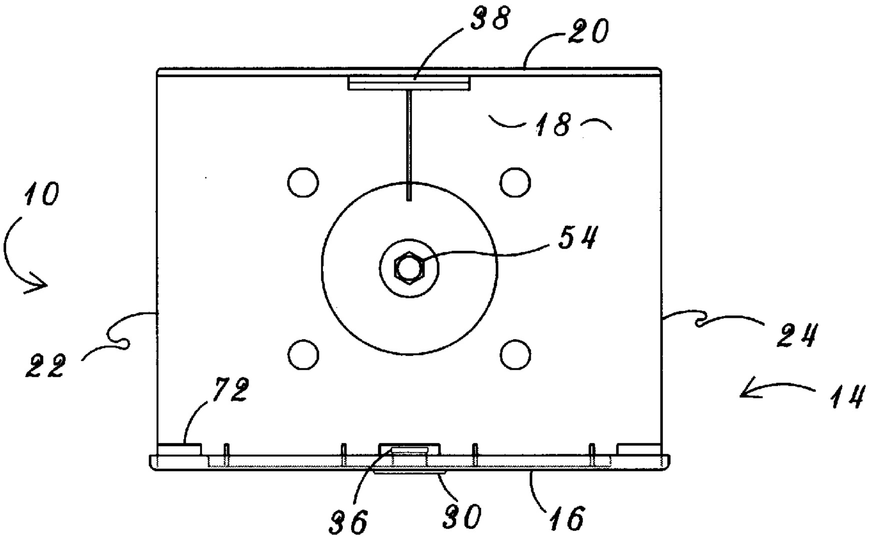
FIG. 2 is a top elevation of the dispenser of FIG. 1.
Figure 1:
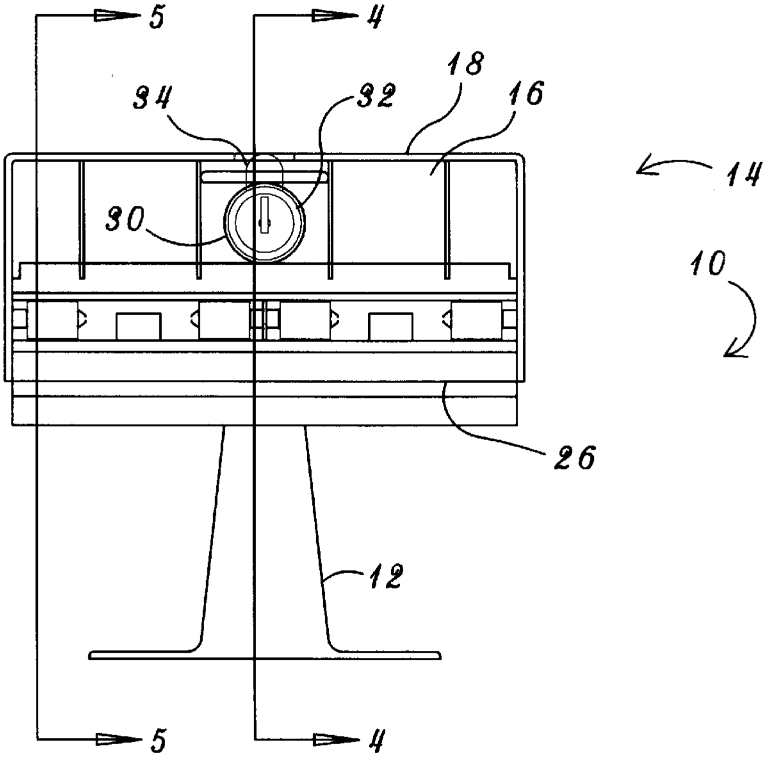
FIG. 1 is a front elevation showing the dispenser and base of the present invention.

With reference to the drawings, the preferred embodiment of a hinged access display and dispensing device assembly is indicated generally at 10 in FIG. 1. Preferably the device 10 is utilized for displaying and dispensing lottery-type tickets (not shown) on the counters of various types of retail establishments, such as convenience stores, that sell such tickets. The device 10 includes a base 12 that is preferably of a pedestal type, a transparent, box-shaped housing 14 and a door 16. The housing 14 has a generally flat top surface 18, a front wall 20, a pair of opposite sidewalls 22 and 24, a bottom surface 26, and a rear open end 28, that allows access to the inside of the housing 14 when the door 16 is opened (FIGS. 1, 2 and 4).

Referring now to FIG. 1, a lock assembly 30 is provided, which includes a body portion 32 and a latching arm portion 34. When the door 16 is closed, the lock assembly 30 can be actuated by a key (not shown) to cause rotation of the arm 34. The arm 34 is rotated until it engages a slot 36 in the flat top surface 18 to secure the door 16 to the housing 14.

The top surface 18 of the housing 14 is provided with a ridge 38 for a purpose to be described later. As shown in FIG. 4, the housing 14 is integrally molded with a pair of rear legs 40 and rear feet 42. As shown in FIGS. 1 and 4, the legs 40 and feet 42 depend from the bottom surface 26 of the housing 14 near the rear open end 28 and near the sidewalls 22 and 24. The cross-section of FIG. 4 shows the device 10 substantially cut in half to reveal an integrally molded hook 44 depending from the front wall 20 of the housing 14. Although the hook 44 may be of any desired size, in the preferred embodiment the hook 44 is preferably seven centimeters wide and depends one centimeter below the bottom surface 26 of the housing 14.

Figure 3:
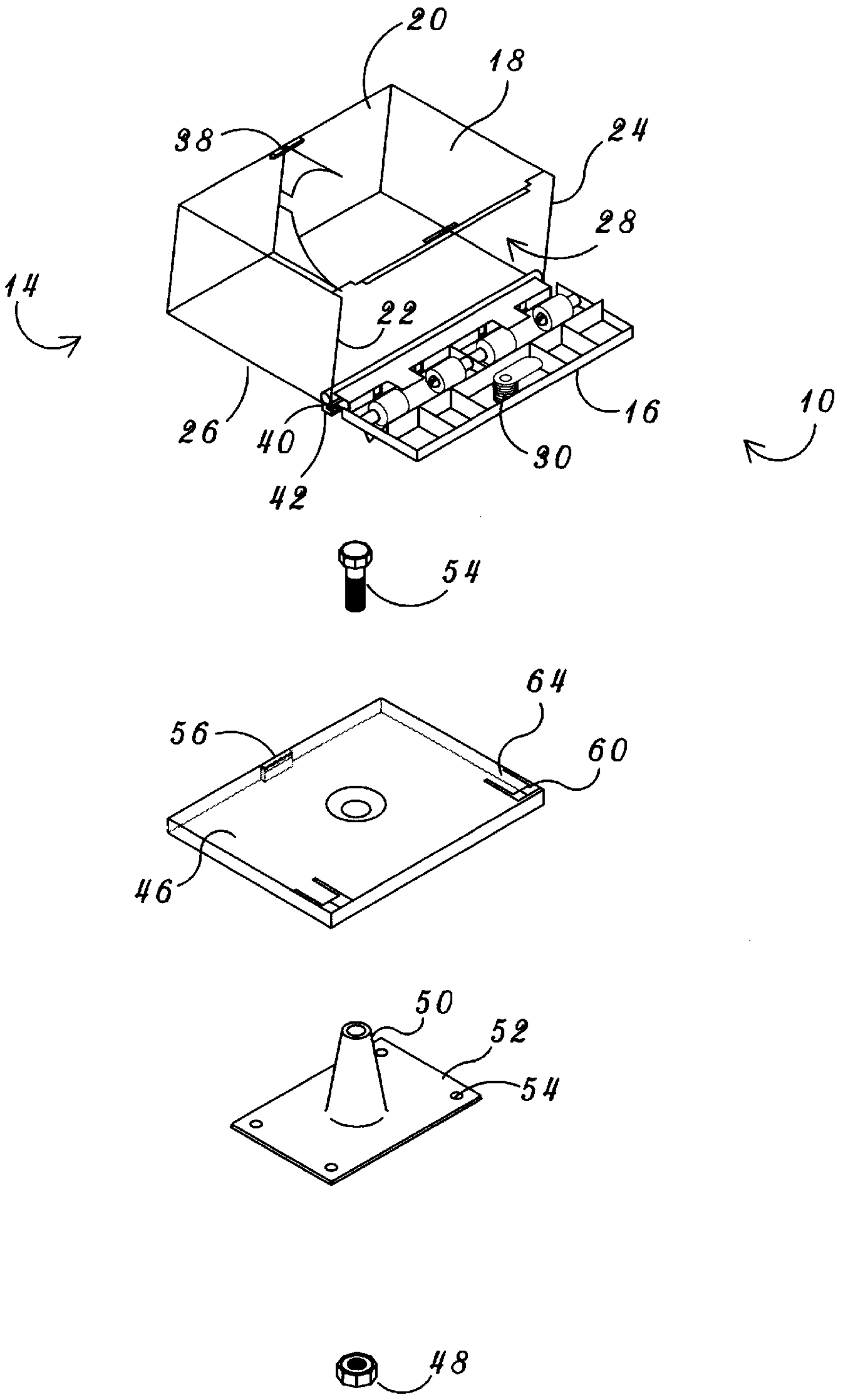
FIG. 3 is an exploded view of the base of FIG. 1.
Figure 4:
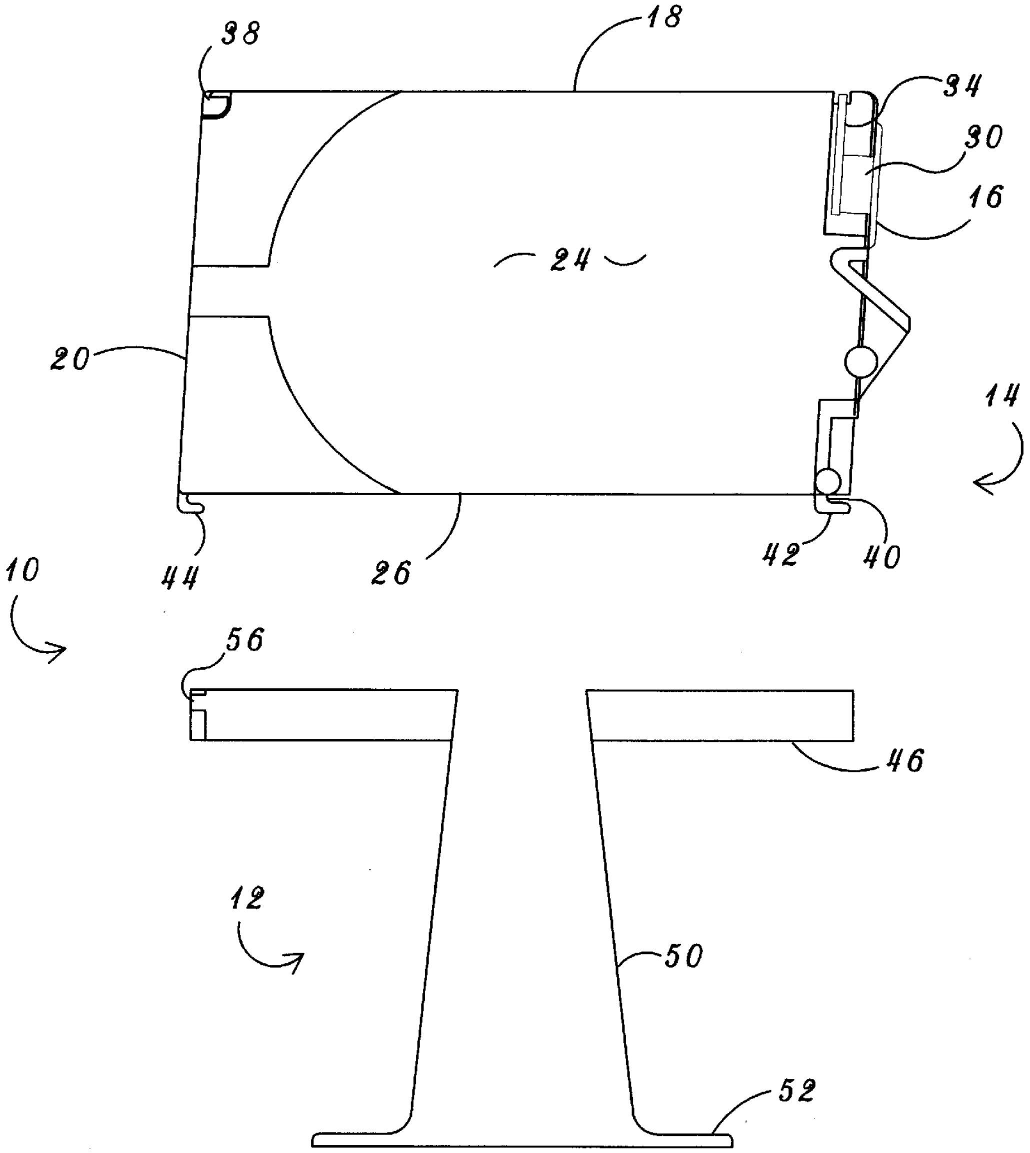
FIG. 4 is a side elevation in partial cross-section taken along line 4—4 of FIG. 1 and shown with the housing disconnected from the base.

As shown in FIGS. 3 and 4, the base 12 is provided with a platform 46, a pedestal 50 and a base plate 52 provided with a plurality of screw holes 54. The platform 46 is integrally molded of a first piece of plastic and the pedestal 50 and base plate 52 are integrally molded of a second piece of plastic. The platform 46 is secured to the pedestal 50 and base plate 52 by a nut 48 and bolt 54 running through the pedestal 50 and secured to the platform 46. Integrally molded near the front of the platform 46 is a ridge 56, designed with dimensions to fit into mating alignment with the hook 44 of the housing 14. The ridge 56 is preferably designed, with sufficient curvature to allow the housing 14 to pivot slightly relative to the base 12 when the hook 44 is coupled around the ridge 56. The ridge 56 is also designed to prevent direct upward movement of the housing relative to the base 12 when the hook 44 is cupped around the ridge 56.

Also provided on the platform 46 are a pair of holes 60 located under the position where the feet 42 of the housing 14 contact the platform 46 when the hook 44 is cupped around the ridge 56. (FIG. 3). As shown in FIG. 3, the holes 60 extend forwardly as narrow slots to form a pair of tongues 64 in the platform 46. As shown in the cross-section of FIG. 5*a*, the tongues 64 are preferably molded with braces 66 which depend from the rearward ends of the tongues 64.

Figure 5A:
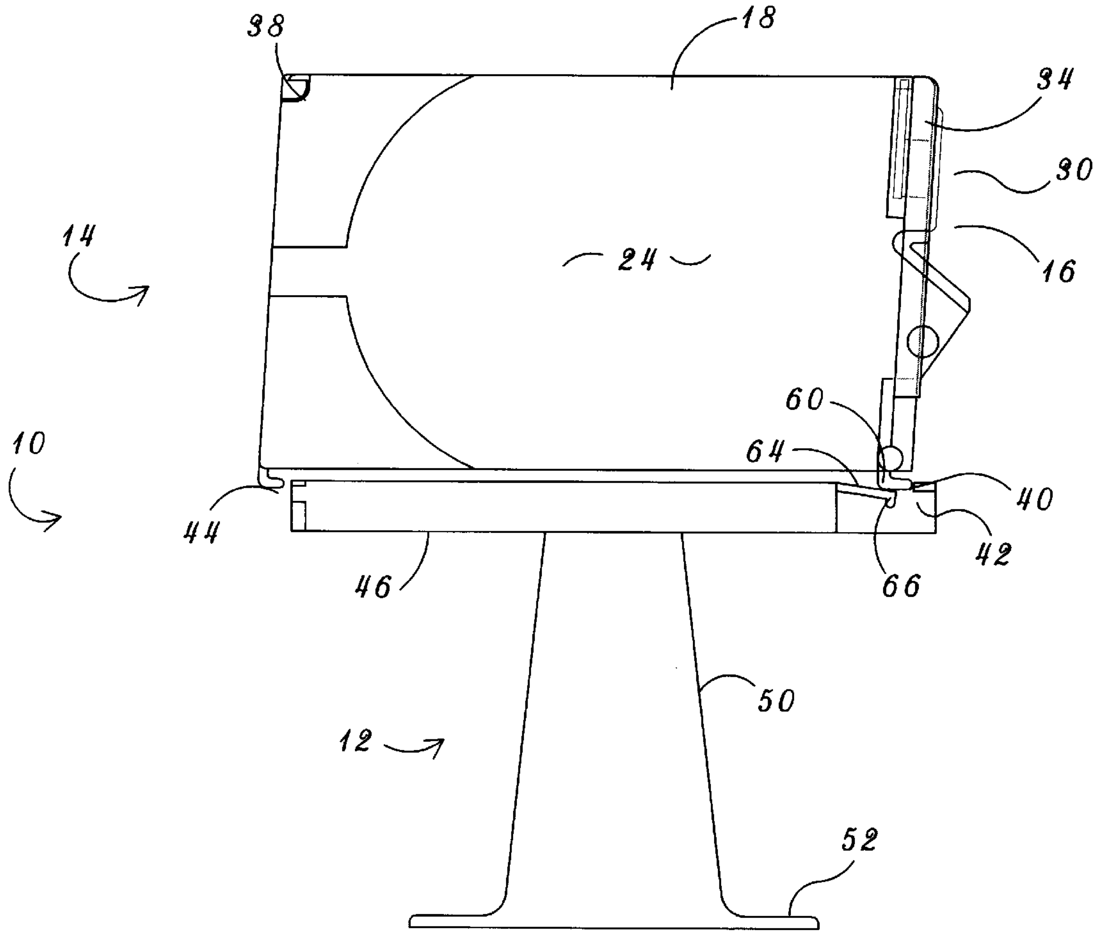
FIG. 5*a* is a side elevation in partial cross-section taken along the line 5—5 of FIG. 1, shown with the leg of the dispenser pressing the resilient tongue downward.

To use the device 10 of the present invention, the base 12 is preferably secured to a counter (not shown) or similar structure by the screw holes 54 of the base plate 52 (FIG. 3). Thereafter, the housing 14 is positioned over the base 12 as shown in FIG. 5*a*. The housing 14 is positioned with the hook 44 extending downwardly and rearwardly of the platform 46. Because the housing 14 is resting forwardly of the platform 46, the feet 42 of the housing 14 are resting partially on the tongue 64 of the platform 46.

Figure 5B:
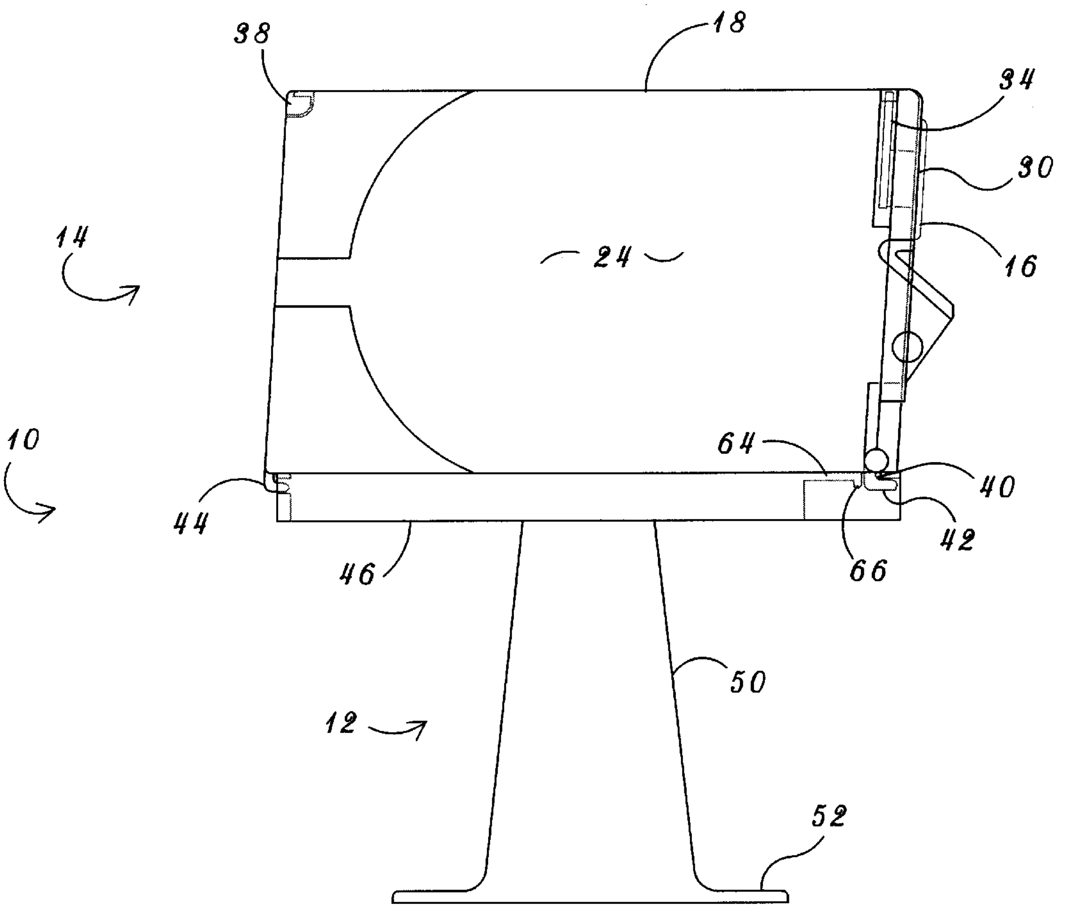
FIG. 5*b* is a side elevation in partial cross-section taken along the line 5—5 of FIG. 1 shown with the hook of the housing clasping the ridge of the base and the foot of the housing positioned under the base, with the resilient tongue maintaining the leg against lateral movement.

As shown in FIG. 5*a*, the housing 14 is pressed downwardly, thereby forcing the feet 42 into the tongue 64 and causing the tongue 64 to bend downwardly. Thereafter, as shown in FIG. 5*b*, the housing 14 is moved rearwardly relative to the platform 46 until the feet 42 move under the platform 46 and off of the tongues 64. The resilient nature of the tongues 64, causes the tongues 64 to return to their predepression position. This rearward movement of the housing 14 relative to the platform 46 causes the hook 44 of the housing 14 to cup around the ridge 56 (FIGS. 3 and 5*b*). As shown in FIG. 5*b*, the braces 66 of the tongues 64 prevent the legs 40 of the housing from moving forward relative to the platform 46. Accordingly, as the legs 40 are unable to move forward, and since the feet 42 are larger than the holes 60, the housing 14 is secured to the base 12.

Although it is possible to remove the housing 14 from the base 12, such removal requires biasing the tongues 64 sufficiently to allow the legs 40 to move forward a distance sufficient to allow the feet 42 to move upwardly through the holes 60. Preferably, the tolerances of the platform 46, tongues 64, legs 40 and feet 42 are such that the housing 14 can be removed from the base 12 only with great difficulty, or with the aid of a specially designed tool (not shown) provided for depressing the tongues 64.

Figure 6:
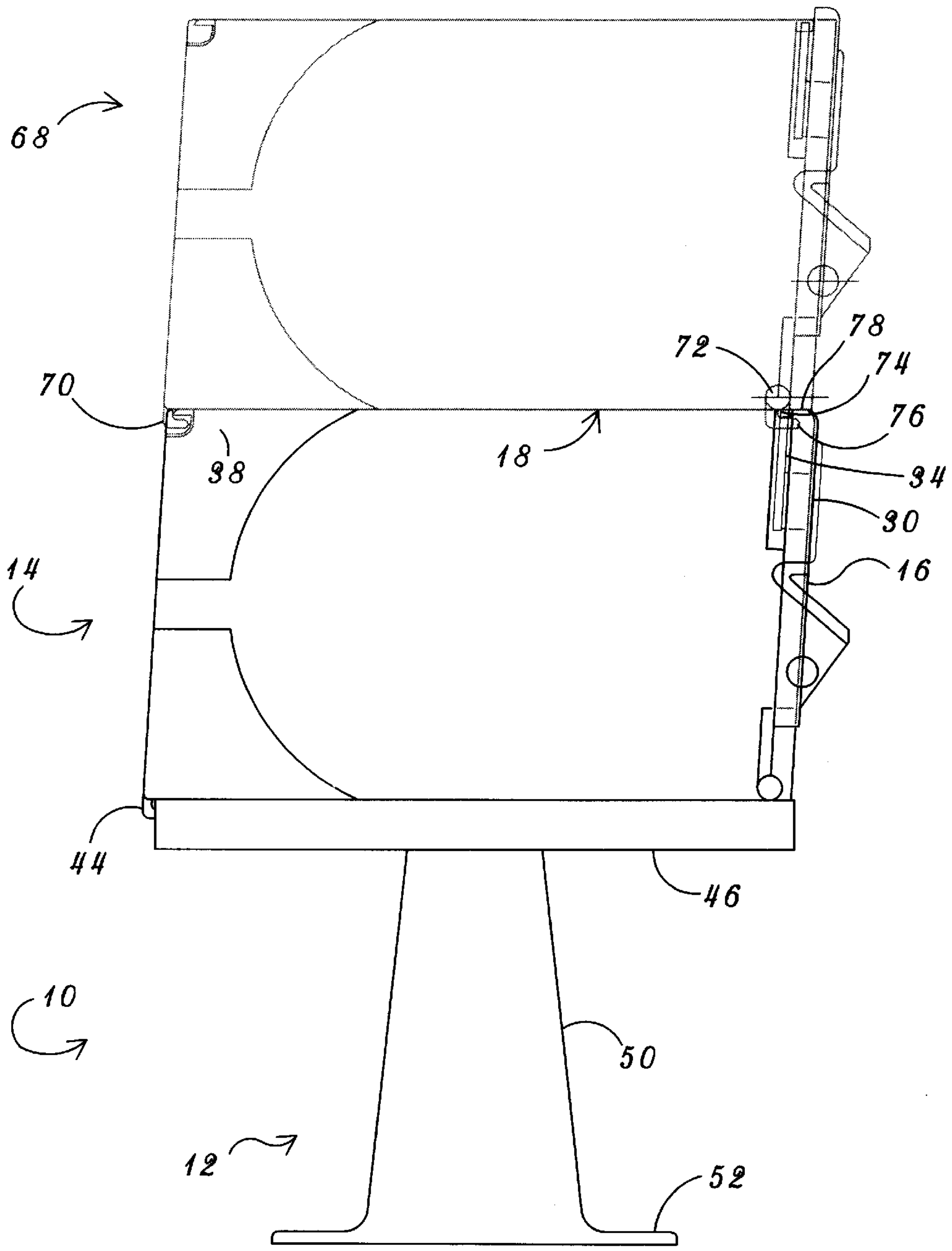
FIG. 6 is a side elevation in partial cross-section shown with the display device of the present invention in conjunction with a second display device coupled thereto.

As shown in FIG. 6, the design of the housing 14 allows a second housing 68 to be secured to the housing 14 to allow two housings to be used with a single base 12. As shown in FIGS. 3 and 6, the second housing 68 is also provided with a hook 70 which cups around the ridge 38 of the housing 14 described above. As shown in FIGS. 2 and 6, the housing 14 is provided on its flat top surface 18 with a pair of slots 72 to accommodate legs 74 and feet 76 of the second housing 68. As shown in FIGS. 2 and 6, the slots 72 by themselves cannot retain the feet 76 of the second housing 78. The door 16 of the housing 14, however, is provided with a lip 78 which, when closed, extends over the feet 76 of the second housing 68. The extension of the lip 78 over the feet 76 retains the legs 74 and prevents the removal of the second housing 68 from the housing 14. The door 16 may thereafter be locked to prevent unauthorized removal of the second housing 68 from the housing 14.

Although the invention has been described with respect to a preferred embodiment thereof, it is to be understood that it is not to be so limited, since changes and modifications can be made therein which are within the full intended scope of this invention as defined by the appended claims. For example, it is anticipated that various styles and shapes of holes and tongues and/or ridges may be provided on the platform to accommodate various configurations of the legs, feet and/or hooks of the housing.

What is claimed is:

1. A hinged access display and dispensing device for lottery-type tickets or the like comprising:

(a) a housing of box-like configuration having a floor, a roof, a pair of sidewalls, a front end and an open rear end;

(b) a door pivotally attached to said housing;

(c) a base provided with a ridge and a hole;

(d) a leg secured to said housing;

(e) a foot secured to said leg and extending away from said leg a sufficient distance to allow said foot to be oriented under said base when said leg is placed in said hole;

(f) resilient means secured to said base for maintaining said foot under said base upon insertion of said leg into said hole; and (g) means provided on said housing for securing said housing to said ridge upon securement of said foot under said base by said resilient means.

2. The display and dispensing device of claim 1, wherein said resilient means is a tongue secured to the base and extending over at least a portion of said hole.

3. The display and dispensing device of claim 2, further comprising a brace secured to said tongue.

4. The display and dispensing device of claim 2, wherein said tongue is secured to said base in a manner which allows said tongue to move from a first position, where said foot can be inserted into said hole, to a second position where said tongue substantially prevents removal of said foot from said hole.

5. The display and dispensing device of claim 1, wherein said securing means is a hook secured to said housing and said ridge is provided with a sufficient curvature to allow said housing to pivot relative to said base when said hook is coupled around said ridge.

6. The display and dispensing device of claim 1, wherein said housing is provided with a supplemental hole and further comprising:

(a) a supplemental leg secured to said housing;

(b) a supplemental foot secured to said supplemental leg and extending away from said supplemental leg a sufficient distance to allow said supplemental foot to be oriented under said base when said supplemental leg is placed in said supplemental hole; and (c) supplemental resilient means secured to said base for maintaining said supplemental foot under said base after insertion of said supplemental leg into said supplemental hole.

7. The display and dispensing device of claim 6, wherein said ridge is substantially centered between, and located on substantially an opposite side of the base from, said hole and said supplemental hole.

8. A hinged access display and dispensing device for lottery-type tickets or the like comprising:

(a) a housing of box-like configuration having a floor, a roof, a pair of sidewalls, a front end and an open rear end;

(b) a door pivotally attached to said housing;

(c) a base provided with a ridge and a hole;

(d) a leg secured to said housing and extending through said hole in said base;

(e) a foot extending laterally from said leg and under said base;

(f) a resilient tongue extending over said hole a sufficient distance to prevent lateral movement of said foot to a degree required to remove said foot from said hole; and (g) securing means secured to said housing and secured around said ridge for preventing separation of said housing from said base.

9. The display and dispensing device of claim 8, further comprising a buttress secured to said tongue.

10. The display and dispensing device of claim 8, wherein said securing means is a hook secured to said housing and said ridge is provided with a sufficient curvature to allow said housing to pivot relative to said base when said hook is coupled to said ridge.

11. The display and dispensing device of claim 8, wherein said housing is provided with a supplemental hole and further comprising:

(a) a supplemental leg secured to said housing;

(b) a supplemental foot secured to said supplemental leg and extending away from said supplemental leg a sufficient distance to allow said supplemental foot to be oriented under said base when said supplemental leg is placed in said supplemental hole; and (c) supplemental resilient means secured to said base for maintaining said supplemental foot under said base after insertion of said supplemental leg into said supplemental hole.

12. The display and dispensing device of claim 11, wherein said ridge is substantially centered between, and located on substantially an opposite side of the base from, said hole and said supplemental hole.

13. The display and despensing device of claim 8, wherein said tongue is secured to said base in a manner which allows said tongue to move from a first position, where said foot can be inserted into said hole, to a second position where said tongue substantially prevents removal of said foot from said hole.

14. A method for securing a housing to a base comprising:

(a) providing a housing of a box-like configuration having a floor, a roof, a pair of sidewalls, a front end, an open rear end, a hook, and a leg having a foot;

(b) pivotally attaching a door to said rear end of said housing, wherein said door is provided with an opening near;

(c) providing a base having a ridge, a hole, and a resilient tongue extending at least partially over said hole;

(d) depressing said tongue with said leg a sufficient distance to move said foot into said hole; and (e) moving said foot away from said tongue until said hook cups said ridge, said foot moves under said base a sufficient distance to substantially prevent direct upward removal of said leg from said hole, and said tongue substantially prevents lateral movement of said leg sufficient to allow upward removal of said leg from said hole.

15. The method of claim 14, wherein said base is provided with a supplemental tongue and supplemental hole, and wherein said housing is provided with a supplemental leg and supplemental foot, further comprising:

(a) depressing said supplemental tongue with said supplemental leg a sufficient distance to move said supplemental foot into said supplemental hole; and (b) moving said supplemental foot away from said supplemental tongue until said hook cups said ridge, said supplemental foot moves under said base a sufficient distance to substantially prevent direct upward removal of said supplemental leg from said supplemental hole, and said supplemental tongue substantially prevents lateral movement of said supplemental leg sufficient to allow upward removal of said supplemental leg from said supplemental hole.

16. The method of claim 14, including securing said tongue to said base in a manner which allows said tongue to move from a first position, where said foot can be inserted into said hole, to a second position where said tongue substantially prevents removal of said foot from said hole.

* * * * *